US010991223B2

(12) United States Patent
Weiss et al.

(10) Patent No.: US 10,991,223 B2
(45) Date of Patent: Apr. 27, 2021

(54) OPTICAL FIRE SENSOR DEVICE AND CORRESPONDING FIRE DETECTION METHOD

(71) Applicants: Robert Bosch GmbH, Stuttgart (DE); Koninklijke Philips N.V., AE Eindhoven (NL)

(72) Inventors: Stefan Weiss, Tübingen (DE); Alexander Herrmann, Reutlingen (DE); Thomas Hanses, Feldkirchen-Westerham (DE); Christopher Haug, Munich (DE); Susanne Weidenfeld, Weilheim (DE); Jens-Alrik Adrian, Pfulligen (DE)

(73) Assignees: ROBERT BOSCH GMBH, Stuttgart (DE); KONINKLIJKE PHILIPS N.V., AE Endhoven (NL)

( * ) Notice: Subject to any disclaimer, the term of this patent is extended or adjusted under 35 U.S.C. 154(b) by 0 days.

(21) Appl. No.: 16/589,781

(22) Filed: Oct. 1, 2019

(65) Prior Publication Data

US 2020/0105114 A1 Apr. 2, 2020

(30) Foreign Application Priority Data

Oct. 2, 2018 (DE) .......................... 102018216909.8

(51) Int. Cl.
*G08B 17/107* (2006.01)
*G01N 15/06* (2006.01)

(52) U.S. Cl.
CPC .......... *G08B 17/107* (2013.01); *G01N 15/06* (2013.01); *G01N 2015/0693* (2013.01)

(58) Field of Classification Search
None
See application file for complete search history.

(56) References Cited

U.S. PATENT DOCUMENTS

| 5,486,811 | A | * | 1/1996 | Wehrle | G08B 17/00 340/522 |
|---|---|---|---|---|---|
| 5,576,697 | A | * | 11/1996 | Nagashima | G08B 17/107 250/574 |
| 7,978,087 | B2 | * | 7/2011 | Siber | G08B 29/24 340/630 |
| 9,677,986 | B1 | * | 6/2017 | Baldwin | G01N 15/06 |

(Continued)

*Primary Examiner* — Curtis J King
(74) *Attorney, Agent, or Firm* — Maginot, Moore & Beck, LLP

(57) ABSTRACT

The present invention provides an optical fire sensor device and a corresponding fire detection method. The optical fire sensor device is equipped with an optical particle detection unit (10), which is configured to ascertain measured values of a particle number in a measurement volume range (FA) as a function of a particle size in a predetermined particle size range and/or as a function of a particle speed in a predetermined particle speed range, a fire detection unit (20), which is configured to ascertain respective distributions of the measured values and to compare at least one parameter of the ascertained distributions to at least one predetermined criterion. The fire detection unit (20) is configured to detect a fire (B) in consideration of the comparison. An alarm unit (30, 40) is used to output an alarm signal in response to the detection of the fire (B) by the fire detection unit (20).

17 Claims, 7 Drawing Sheets

(56) References Cited

U.S. PATENT DOCUMENTS

| | | | | |
|---|---|---|---|---|
| 2003/0011770 | A1* | 1/2003 | Cole | G08B 17/107 356/338 |
| 2004/0056765 | A1* | 3/2004 | Anderson | A62C 99/0045 340/522 |
| 2008/0218364 | A1* | 9/2008 | Mizuo | G08B 17/107 340/630 |
| 2009/0009345 | A1* | 1/2009 | Conforti | G08B 17/107 340/627 |
| 2009/0212959 | A1* | 8/2009 | Suber, III | G08B 25/08 340/603 |
| 2010/0271219 | A1* | 10/2010 | Lang | G08B 17/10 340/628 |
| 2011/0068936 | A1* | 3/2011 | Shimada | G08B 17/113 340/584 |
| 2011/0188039 | A1* | 8/2011 | Aoyama | G01N 21/53 356/338 |
| 2012/0092176 | A1* | 4/2012 | Aebersold | G08B 17/107 340/630 |
| 2013/0334417 | A1* | 12/2013 | Lewiner | G01N 15/0656 250/338.5 |
| 2015/0029320 | A1* | 1/2015 | Wieser | H04N 5/2252 348/77 |
| 2015/0228171 | A1* | 8/2015 | Aebersold | G08B 17/107 340/630 |
| 2015/0310717 | A1* | 10/2015 | Al-Farra | G08B 17/12 340/628 |
| 2015/0371514 | A1* | 12/2015 | Bonisch | G08B 17/103 340/630 |
| 2015/0379846 | A1* | 12/2015 | Bressanutti | G08B 17/113 340/630 |
| 2016/0153905 | A1* | 6/2016 | Allemann | G01N 21/53 356/338 |
| 2016/0313243 | A1* | 10/2016 | Dittrich | G01N 15/1434 |
| 2017/0046935 | A1* | 2/2017 | Allemann | G08B 17/103 |

* cited by examiner

OPTICAL FIRE SENSOR DEVICE AND CORRESPONDING FIRE DETECTION METHOD

PRIORITY CLAIM

This application claims priority to German Application No. DE 10 2018 216 909.8, filed on Oct. 2, 2018. The entire contents of the above-mentioned patent applications are incorporated herein by reference as part of the disclosure of this U.S. application.

The present invention relates to an optical fire sensor device and a corresponding fire detection method.

PRIOR ART

Typical fire detectors identify fires and discriminate fires from false alarms on the basis of static and dynamic patterns of smoke particles. The most widespread fire detectors are optical or photoelectric fire detectors. They operate according to the scattered light method, which is based on the fact that smoke particles in an optical chamber of the fire detector scatter a test light beam. A part of this scattered light is then incident on a light-sensitive sensor, which is not illuminated directly by the test light beam, whereupon a fire can be detected.

To avoid false alarms, additional sensors are frequently used, for example LED sensors, temperature sensors, or CO sensors. This enables fires to be differentiated from clouds of dust or clouds of steam or cigarette smoke.

Known optical fire detectors use incoherent light having an optical path, the length of which is typically several centimetres, to achieve a sufficient signal strength. The measurement chamber thereof has to be protected from ambient light.

Particle sensors which have a volume of less than 1 cm$^3$ have been developed in recent years. This opens up new options for the integration of such particle sensors into mobile devices, for example smart phones, inter alia.

An optical particle sensor device is known from DE 10 2015 207 289 A1, which comprises a VCSEL laser diode having integrated photodiode. A VCSEL laser diode (VCSEL=vertical-cavity surface-emitting laser) is a light-emitting diode, in which the light is emitted perpendicularly in relation to the plane of the semiconductor chip. By means of the self-mixing interference technique, the known optical particle sensor device enables items of information to be obtained with respect to a presence of particles, in particular particle number and particle speed.

FIG. 10 is a block diagram to explain an optical particle sensor device known from DE 10 2015 207 289 A1. In FIG. 10, reference sign 50a denotes an optical emitter unit and 50b denotes an optical detector unit, wherein the optical emitter unit 50a is a VCSEL laser and the optical detector unit 50b is a photodiode. The optical emitter unit 50a and the optical detector unit 50b are integrated in a VCSEL sensor chip 66, in which a self-mixing interference analysis function is integrated. The optical emitter unit 50a emits an optical measurement beam 52. By means of a lens unit 58, the optical measurement beam 52 is focused in a focus region 60, in which the particles 56 are to be detected.

The measurement beam 62 scattered by the particles is focused by the lens unit 58 on a detection surface 64 of the VCSEL sensor chip 66. An optional mirror unit 74 enables the focus region 60 to be displaced one-dimensionally or two-dimensionally within the focus region 60.

The optical detector unit 50b is designed to output an information signal 68 with respect to an intensity and/or an intensity distribution of the scattered electrical measurement beam 62 resulting on the detection surface 64. An analysis unit 70 supplies an information signal 72 with respect to a presence of the particles 56, a particle number, or another property of the particles 56. In particular, the particle speed is also of interest.

The self-mixing interference method is described, for example, in G. Giuliani et al., Laser Diode Self-Mixing Technique for Sensing Applications, Journal of Optics A: Pure and Applied Optics, 2002, 4, page 283-page 294. It is based on a measurement beam backscattered by a particle interfering with the emitted measurement beam and thus modulating the emitted intensity of the measurement beam.

US 2016/0025628 A1 discloses a smart phone having an integrated optical particle sensor device.

DE 10 2009 045 977 A1 discloses a mobile device, which is designed as an automated component for integration in a security system for securing persons and/or regions. An optical fire sensor device having a function for detecting the fire particle density is listed as a security system.

DE 10 060 044 A1 discloses an optical fire sensor device having a scattered light detector.

DISCLOSURE OF THE INVENTION

The present invention provides an optical fire sensor device that comprises:
  an optical particle detection unit, which is configured to ascertain measured values of a particle number in a measurement volume region as a function of a particle size in a predetermined particle size range and/or as a function of a particle speed in a predetermined particle speed range;
  a fire detection unit, which is configured to ascertain respective distributions of the measured values and to compare at least one parameter of the ascertained distributions to at least one predetermined criterion;
  wherein the fire detection unit is configured to detect a fire in consideration of the comparison; and
  an alarm unit for outputting an alarm signal in response to the detection of the fire by the fire detection unit.

The present invention further provides a corresponding fire detection method comprising the following steps:
  ascertaining measured values of a particle number in a measurement volume range as a function of a particle size in a predetermined particle size range and/or as a function of a particle speed in a predetermined particle speed range;
  ascertaining respective distributions of the measured values and comparing at least one parameter of the ascertained distributions to at least one predetermined criterion;
  detecting a fire in consideration of the comparison; and
  outputting an alarm signal in response to the detection of the fire.

Advantages of the Invention

The concept on which the present invention is based is to provide an optical fire sensor device which enables it to ascertain measured values of a particle number in a measurement volume region as a function of a particle size and/or as a function of a particle speed.

The present invention enables the use of focused measurement beams of high intensity and high coherence.

Smoke particles can be detected in a very small measurement volume, and smoke patterns having high complexity can be precisely identified.

The optical fire sensor device according to the invention can be formed substantially smaller than known devices, i.e., in an order of magnitude of several millimetres. In particular, an optical chamber can be omitted. This improves the aesthetic appearance and the practical handling.

According to a further preferred embodiment, the fire detection unit is configured to transmit the ascertained distributions of the measured values to an analysis centre for comparison of the at least one parameter of the ascertained distributions to the at least one predetermined criterion by means of the transceiver unit and to receive a corresponding analysis for the detection of the fire from the analysis centre by means of the transceiver unit. The computing-intensive analysis of the ascertained distributions can thus be carried out externally, which reduces the complexity of the fire detection unit.

According to a further preferred embodiment, the fire detection unit is configured to detect the fire type associated with the detected fire in consideration of the comparison, and wherein the alarm unit is configured to output an alarm signal specifying the fire type in response to the detection of the fire and the associated fire type. Additional items of information can thus be generated, which are required for the firefighting.

According to a further preferred embodiment, the fire detection unit is configured to ascertain a chronological development of the distributions of the measured values and to detect the fire and/or the associated fire type with additional consideration of the chronological development of the distributions. The accuracy of the detection of fire and fire type can thus be increased.

According to a further preferred embodiment, the parameter comprises a mean value of the particle size and/or the particle speed.

According to a further preferred embodiment, the parameter comprises a particle number at the mean value of the particle size and/or the particle speed.

According to a further preferred embodiment, the parameter comprises a full width at half maximum or a higher torque of the distribution.

According to a further preferred embodiment, a storage unit is provided, in which the at least one predetermined criterion is storable. The overall analysis for the fire detection can thus be carried out locally.

According to a further preferred embodiment, a query unit is provided, by which the at least one predetermined criterion can be queried via a network from a data source unit. This enables a database, which can be continuously updated, to be accessed.

According to a further preferred embodiment, the alarm unit comprises an acoustic and/or optical display unit.

According to a further preferred embodiment, the alarm unit comprises a transmission unit for transmitting the alarm signal via a network to an alarm centre. An automatic fire alarm can thus be triggered, which can be conducted directly to the fire brigade.

According to a further preferred embodiment, the particle detection unit comprises an optical emitter unit for orienting an optical measurement beam through an optical exit region toward the outside of a housing into a focus region, within which a particle detection can be carried out, and an optical detector unit arranged in the housing for detecting the measurement beam scattered by particles and for outputting items of information about the particle concentration.

According to a further preferred embodiment, the optical emitter unit comprises a laser diode, in particular a VCSEL diode, and the optical detector unit comprises a photodiode integrated into the laser diode. Such an arrangement is particularly compact.

According to a further preferred embodiment, the measurement beam and the scattered measurement beam can be analyzed by an algorithm by means of the self-mixing interference method. The coherence ensures that an external light influence is dispensed with. Furthermore, an optical chamber can be omitted.

According to a further preferred embodiment, the optical fire sensor device is arranged in a portable device, in particular in a smart phone.

BRIEF DESCRIPTION OF THE DRAWINGS

In the figures.

In the figures, identical or functionally-identical elements are provided with the same reference signs.

DESCRIPTION OF THE EXEMPLARY EMBODIMENTS

Figure 1:
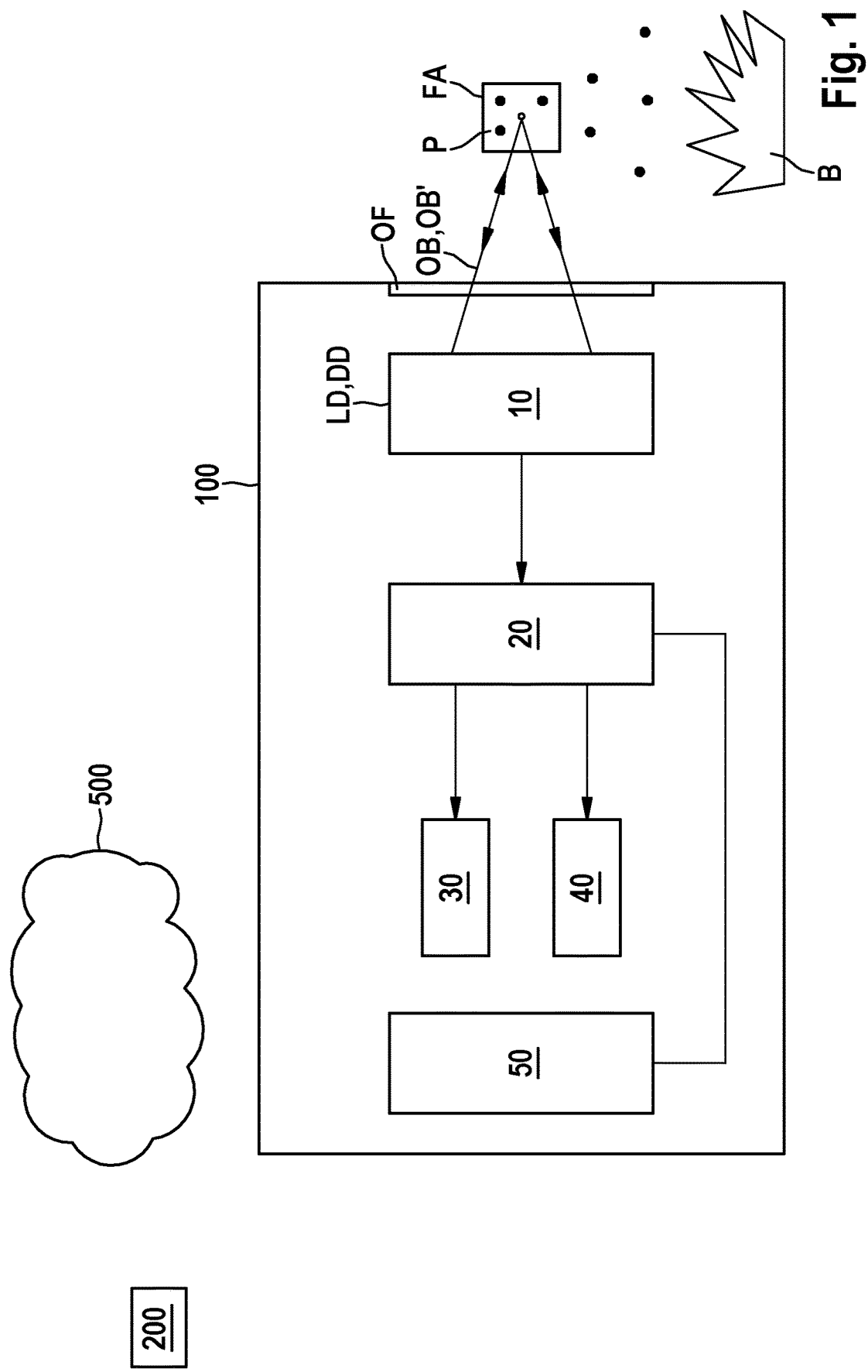
FIG. 1 shows a block diagram to explain an optical fire sensor device according to a first embodiment of the present invention.

FIG. 1 is a block diagram to explain an optical fire sensor device according to a first embodiment of the present invention.

In FIG. 1, reference sign 100 denotes a housing, for example the housing of a smart phone, in which an optical particle detection unit 10 is provided, which is configured to ascertain measured values of a particle number in a measurement volume region as a function of a particle size in a predetermined particle size range and/or as a function of a particle speed in a predetermined particle speed range. In this case, the predetermined particle size range and the predetermined particle speed measurement range are dependent on design details and/or settings of the particle detection unit 10.

The particle detection unit 10 comprises an optical emitter unit LD for orienting an optical measurement beam OB through an optical exit region OF toward the outside of the housing 100 into a focus region FA, also denoted as a measurement volume region. A detection of particles P can be carried out inside the focus region FA. An optical detector unit DD for detecting the measurement beam OB' scattered by the particles P and for outputting items of information about the particle concentration is also arranged in the housing 100.

In the present embodiment, the optical emitter unit LD is a laser diode, in particular a VCSEL diode, and the optical detector unit DD is a photodiode integrated into the laser diode. To ascertain the particle concentration, the measurement beam OB and the scattered measurement beam OB' are analyzed by an algorithm by means of the self-mixing interference method.

Reference sign 20 denotes a fire detection unit, which is configured to ascertain respective distributions of the measured values on the basis of the measured values of the particle size and/or the particle speed output by the optical particle detection unit 10 and to compare at least one parameter of the ascertained distributions to at least one predetermined criterion.

The at least one predetermined criterion is stored in a storage unit 50 in the first embodiment. Examples of such criteria, which reflect parameters of the ascertained distributions, are mean value of the particle size and/or the particle speed, a particle number at the mean value of the particle size and/or the particle speed, a full width at half maximum of the respective distribution, etc.

In addition, in the first embodiment, the fire detection unit 20 is configured to ascertain a chronological development of the distributions of the measured values and, with additional consideration of the chronological developments of the distributions, to detect criteria for the detection of a fire B and optionally the associated fire type.

The fire detection unit 20 is thus capable of detecting the fire B in consideration of the comparison or multiple comparisons.

In response to the detection of the fire B by the fire detection unit, the fire detection unit 20 activates an alarm unit 30, 40 to output an alarm signal. In the first embodiment, the alarm unit 30, 40 comprises an acoustic and/or optical display unit 30 and a transmission unit 40 for transmitting the alarm signal via a network 500, for example the Internet, to an alarm centre 200.

An alarm can thus be triggered locally at the optical fire sensor device, on the one hand, and the alarm can be relayed to the alarm centre 200 at the same time, so that corresponding precautions can already be taken there, for example alarming the fire brigade. If the reported alarm also comprises the associated fire type, corresponding apparatus precautions can already be taken by the fire brigade.

Figure 2:
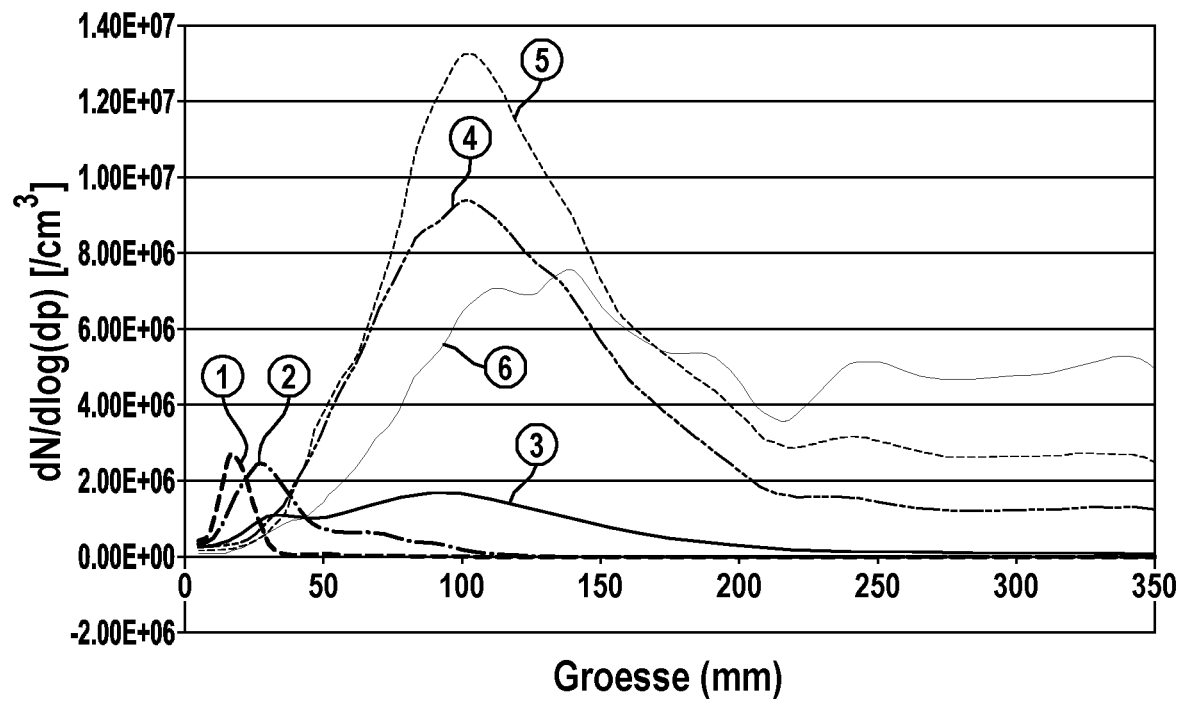
FIG. 2 shows experimentally ascertained particle size distributions in the case of an open wood fire at different points in time after fire breakout.

FIG. 2 shows experimentally ascertained particle size distributions in the case of an open wood fire at different points in time after fire breakout.

In FIG. 2, the curve 1 denotes the particle size distribution 2 minutes after fire breakout, the curve 2 denotes the particle size distribution 4 minutes after fire breakout, the curve 3 denotes the particle size distribution 6 minutes after fire breakout, the curve 4 denotes the particle size distribution 8 minutes after fire breakout, the curve 5 denotes the particle size distribution 10 minutes after fire breakout, and the curve 6 denotes the particle size distribution 12 minutes after fire breakout.

As is apparent from FIG. 2, in the case of an open wood fire, small particles having a size of less than 50 nm arise within the first 4 minutes after fire breakout. An agglomeration takes place from 6 minutes after fire breakout, and the mean value of the particle size reaches a value of approximately 100 nm. Moreover, the distributions broaden significantly with increasing duration after fire breakout.

Figure 3:
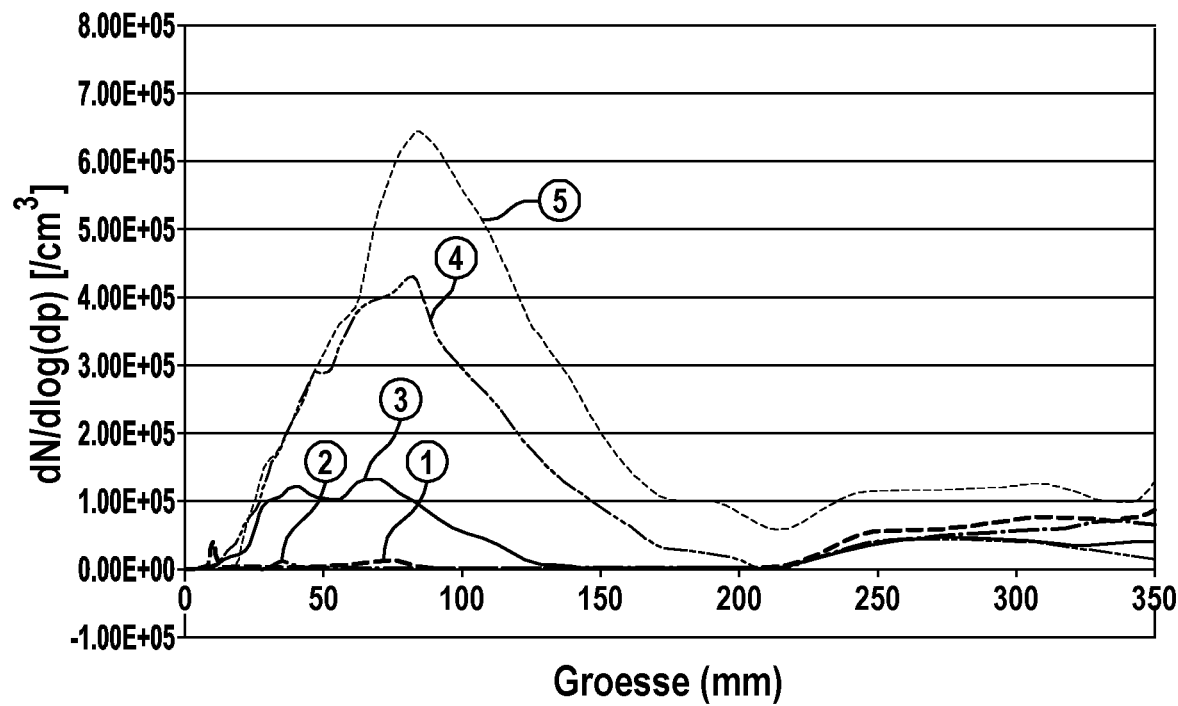
FIG. 3 shows experimentally ascertained particle size distributions in the case of a smoldering wood fire at different points in time after fire breakout.

FIG. 3 shows experimentally ascertained particle size distributions in the case of a smoldering wood fire at different points in time after fire breakout.

In FIG. 3, the curve 1 denotes the particle size distribution 2 minutes after fire breakout, the curve 2 denotes the particle size distribution 4 minutes after fire breakout, the curve 3 denotes the particle size distribution 6 minutes after fire breakout, the curve 4 denotes the particle size distribution 8 minutes after fire breakout, and the curve 5 denotes the particle size distribution 10 minutes after fire breakout.

As is apparent from FIG. 3, in the case of a smoldering wood fire, smoke particles are first detectable 6 minutes after fire breakout, and the size mean value thereof is 70 nm, i.e., higher in comparison to the open wood fire according to FIG. 2.

Approximately 10 minutes after fire breakout, the mean value of the particle size is 80 nm. The breadths of the distributions detected in the case of the smoldering wood fire are less in comparison to the breadths of the distributions in the case of the open wood fire according to FIG. 2.

Figure 4:
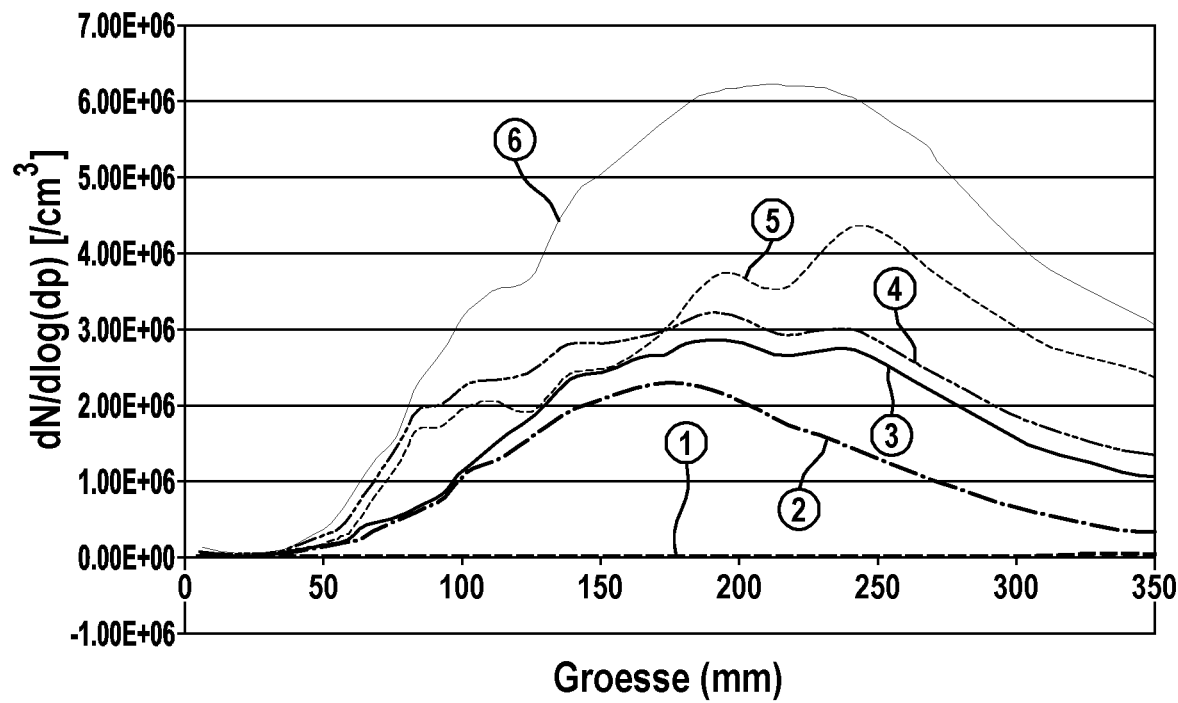
FIG. 4 shows experimentally ascertained particle size distributions in the case of a smoldering cotton fire at different points in time after fire breakout.

FIG. 4 shows experimentally ascertained particle size distributions in the case of a smoldering cotton fire at different points in time after fire breakout.

In FIG. 4, the curve 1 denotes the particle size distribution 2 minutes after fire breakout, the curve 2 denotes the particle size distribution 4 minutes after fire breakout, the curve 3 denotes the particle size distribution 6 minutes after fire breakout, the curve 4 denotes the particle size distribution 8 minutes after fire breakout, the curve 5 denotes the particle size distribution 10 minutes after fire breakout, and the curve 6 denotes the particle size distribution 12 minutes after fire breakout.

In the case of the smoldering cotton fire, particles are detectable 4 minutes after fire breakout, the mean particle size of which is already approximately 170 nm. In the further course of the fire, the mean particle size shifts to up to 200 nm according to curve 6, and the distribution breadth increases with increasing fire duration as in the above example. Moreover, the distribution breadths in the case of the smoldering cotton fire are substantially greater than in the case of the open and smoldering wood fire according to FIGS. 2 and 3.

Figure 5:
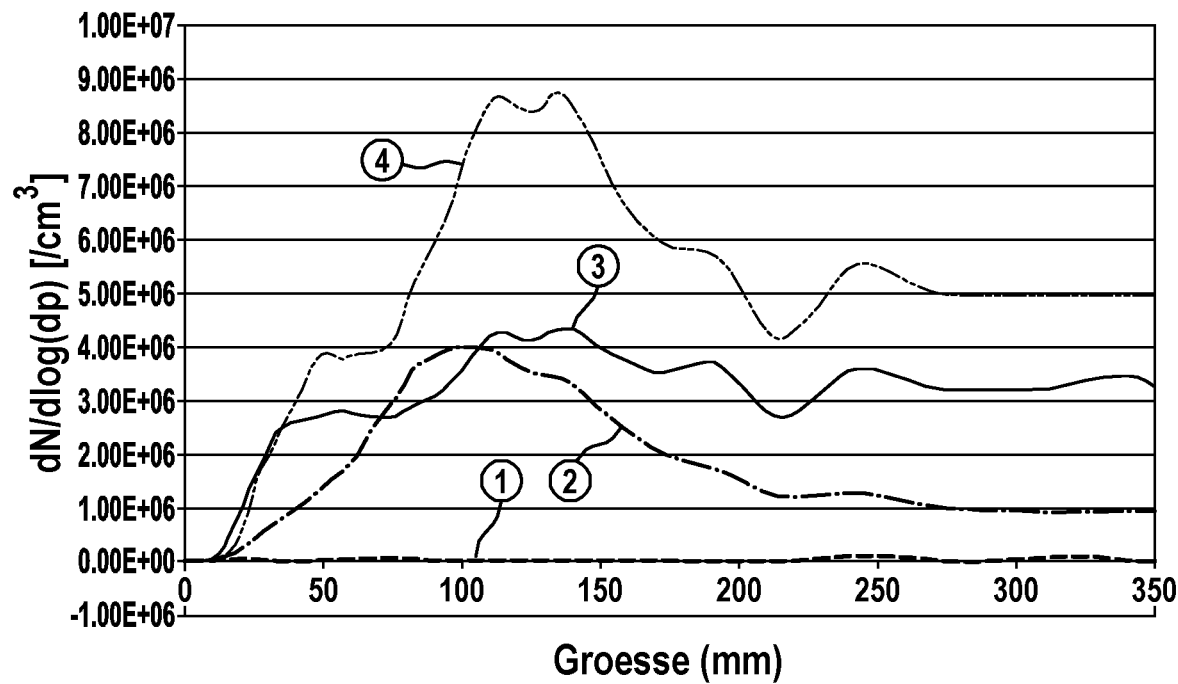
FIG. 5 shows experimentally ascertained particle size distributions in the case of an open plastic fire at different points in time after fire breakout.

FIG. 5 shows experimentally ascertained particle size distributions in the case of an open plastic fire at different points in time after fire breakout.

In FIG. 5, the curve 1 denotes the particle size distribution 2 minutes after fire breakout, the curve 2 denotes the particle size distribution 4 minutes after fire breakout, the curve 3 denotes the particle size distribution 6 minutes after fire breakout, and the curve 4 denotes the particle size distribution 8 minutes after fire breakout.

In the case of the open plastic fire, the mean values of the particle size are consistently at approximately 100 nm, wherein the agglomeration rises with increasing fire duration and the breadth of the particle distribution remains approximately constant.

Therefore, FIGS. 2-5, and also further examples (not shown), show that fires and the fire types thereof can be unambiguously discriminated on the basis of the particle size distribution and in addition on the basis of the chronological development thereof.

Figure 6:
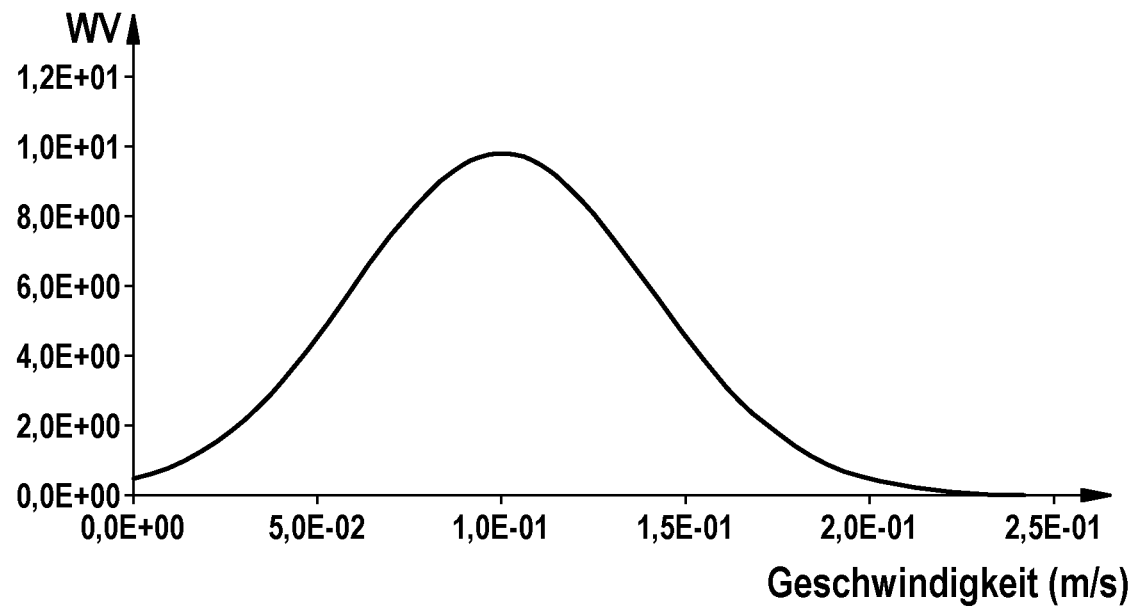
FIG. 6 shows a theoretically ascertained particle speed probability distribution of smoke particles at 45° C.

FIG. 6 shows a theoretically ascertained particle speed probability distribution WF of smoke particles at 45° C.

As is apparent from FIG. 6, in the case of smoke particles, a mean speed of the particles is 0.1 m/s. This speed distribution according to FIG. 6 may be derived theoretically, for example, from the Maxwell speed distribution, wherein a particle size of 0.15 μm and a particle density of 1.5 g/cm$^3$ are assumed for smoke particles and a temperature of 45° C. It is additionally assumed in this case that the smoke particles are additionally accelerated by convection.

Figure 7:
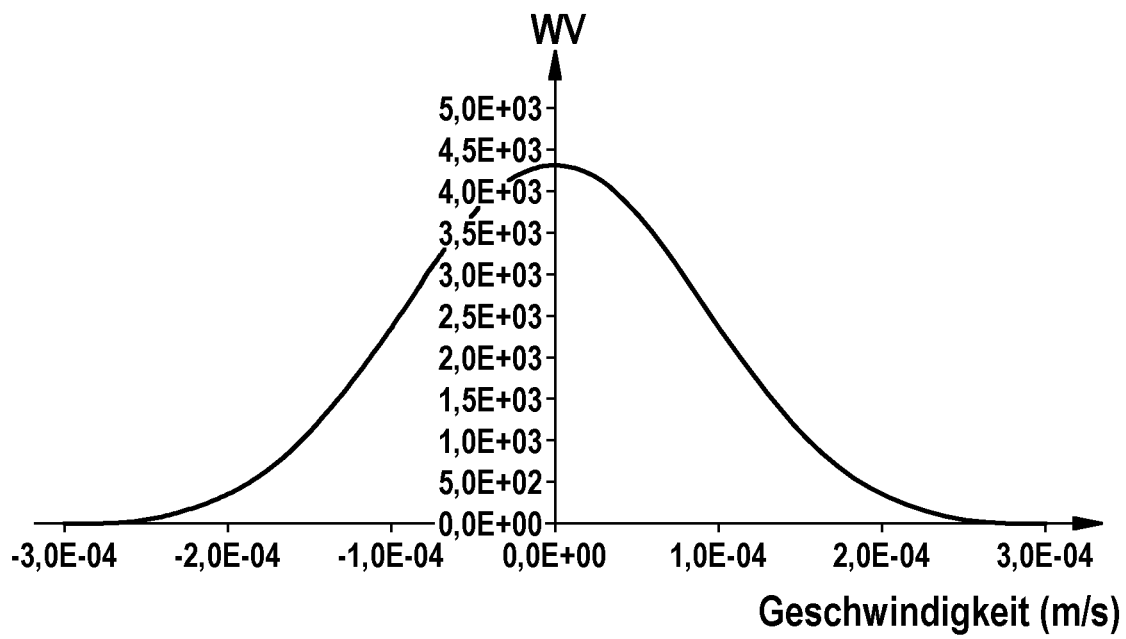
FIG. 7 shows a theoretically ascertained particle size probability distribution of water drops at 45° C.

FIG. 7 shows a theoretically ascertained particle speed probability distribution WF of water drops at 45° C.

FIG. 7 shows the speed distribution of water drops at temperatures of 45° C., wherein a particle size of 10 μm and a density of 1 g/cm$^3$ are assumed. The mean speed value is thus only 0.001 m/s. The convection component is absent in the case of water drops, and the distribution of the water vapour in the room is solely determined by the diffusion.

This shows that fires and the fire types thereof and/or non-fires with particle load can also be unambiguously discriminated on the basis of the speed distribution of the particles.

Figure 8:
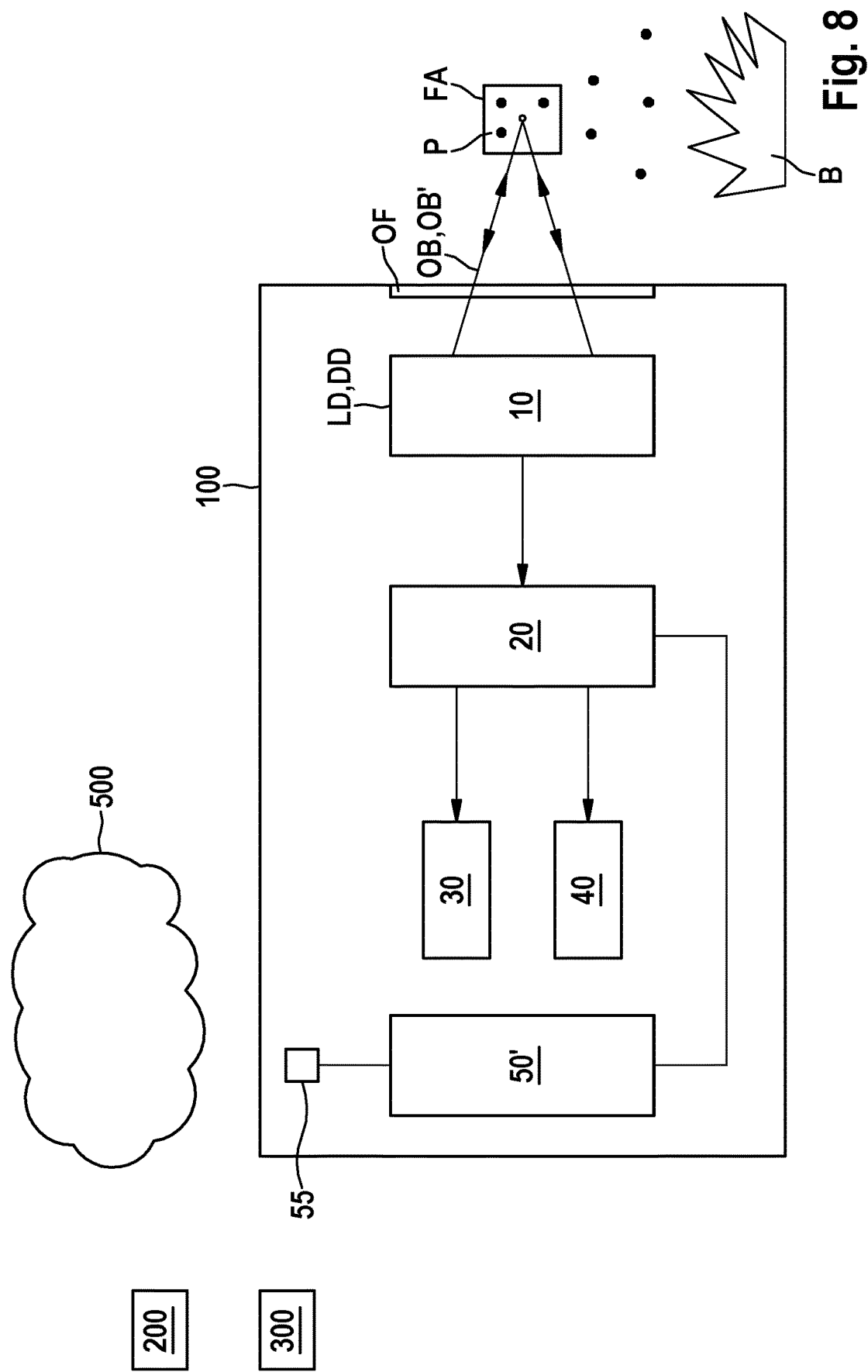
FIG. 8 shows a block diagram to explain an optical fire sensor device according to a second embodiment of the present invention.

FIG. 8 shows a block diagram to explain an optical fire sensor device according to a second embodiment of the present invention.

In the second embodiment, in comparison to the above-described first embodiment, instead of the storage unit 50, a query unit 50', 55 is provided, by which the at least one predetermined criterion can be queried via the network 500, for example the Internet, from a data source unit 300.

Reference sign 55 denotes in this case, for example, a GSM antenna unit, which enables a remote query of the query unit 50' via a mobile radio network.

On the basis of the at least one predetermined criterion thus queried, the fire detection unit 20 can then compare the respective ascertained distributions of the measured values with respect to at least one parameter to at least one predetermined criterion, as is also the case in the above-described first embodiment.

Figure 9:
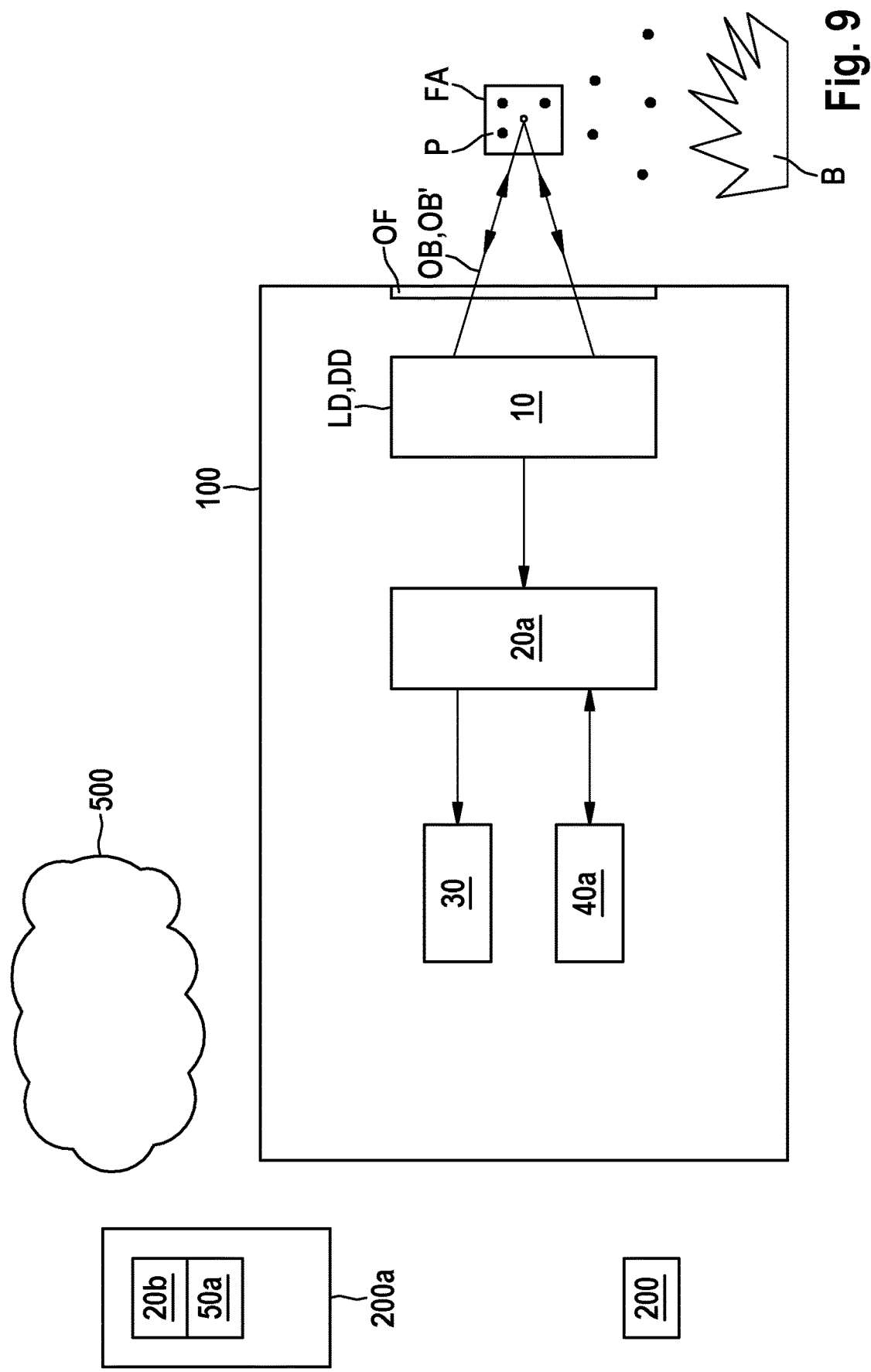
FIG. 9 shows a block diagram to explain an optical fire sensor device according to a third embodiment of the present invention.
Figure 10:
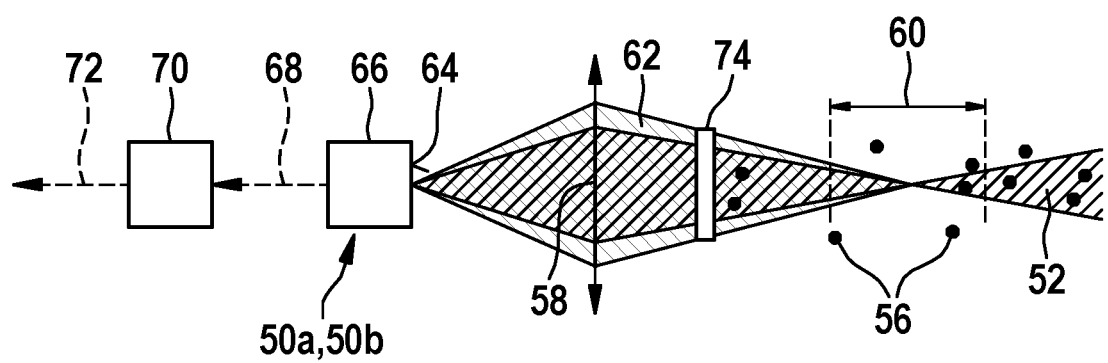
FIG. 10 shows a block diagram to explain an optical particle sensor device known from DE 10 2015 207 289 A1.

FIG. 9 shows a block diagram to explain an optical fire sensor device according to a third embodiment of the present invention.

In the third embodiment, a transceiver unit 40a is provided, which can communicate bidirectionally with an analysis centre 200a. The fire detection unit 20a is configured to transmit the ascertained distributions of the measured values by means of the transceiver unit 40a to the analysis centre 200a for comparison of the at least one parameter of the ascertained distributions to the at least one predetermined criterion.

The analysis centre 200a comprises an analysis unit 20b, which is connected to a storage unit 50a, in which the at least one predetermined criterion can be stored. The analysis unit 20b can thus carry out the comparison of the at least one parameter of the ascertained distributions, which are transmitted by the fire detection unit 20a, to the at least one predetermined criterion and transmit a corresponding analysis result back to the fire detection unit 20a via the transceiver unit 40a, so that the fire detection unit 20a can detect a fire via the analysis result.

As in the first embodiment, the fire detection unit 20a can activate an acoustic and/or optical display unit 30 to output an alarm signal.

In the present example, the analysis centre 200a can inform the alarm centre 200 about the occurrence of the fire B and the associated fire directly via the network 500.

The invention claimed is:

1. An optical fire sensor device comprising:
   an optical particle detection unit, which is configured to ascertain measured values of a particle number in a measurement volume region as a function of a particle size in a predetermined particle size range and/or as a function of a particle speed in a predetermined particle speed range;
   a fire detection unit, which is configured to ascertain respective distributions of the measured values and to compare at least one parameter of the ascertained distributions to at least one predetermined criterion;
   wherein the fire detection unit is configured to detect a fire in consideration of the comparison of the at least one parameter of the ascertained distributions to at least one predetermined criterion, and wherein the fire detection unit is configured to ascertain a chronological development of the distributions of the measured values and to detect the fire and to detect an associated fire type of the fire with additional consideration of the chronological development of the distributions; and
   an alarm unit for outputting an alarm signal in response to the detection of the fire by the fire detection unit and to output an alarm signal specifying the fire type in response to the detection of the fire and the associated fire type.

2. The optical fire sensor device according to claim 1, wherein a transceiver unit is provided and wherein the fire detection unit is configured to transmit the ascertained distributions of the measured values by means of the transceiver unit to an analysis centre for comparison of the at least one parameter of the ascertained distributions to the at least one predetermined criterion and to receive a corresponding analysis for the detection of the fire by means of the transceiver unit from the analysis centre.

3. The optical fire sensor device according to claim 1, wherein the parameter comprises a mean value of the particle size and/or the particle speed.

4. The optical fire sensor device according to claim 1, wherein the at least one parameter comprises a particle number at the mean value of the particle size and/or the particle speed.

5. The optical fire sensor device according to claim 1, wherein the at least one parameter comprises a full width at half maximum or a higher torque of the distribution.

6. The optical fire sensor device according to claim 1, wherein a storage unit is provided, in which the at least one predetermined criterion is storable.

7. The optical fire sensor device according to claim 1, wherein a query unit is provided, by which the at least one predetermined criterion can be queried via a network from a data source unit.

8. The optical fire sensor device according to claim 1, wherein the alarm unit comprises an acoustic and/or optical display unit.

9. The optical fire sensor device according to claim 1, wherein the alarm unit comprises a transmission unit for transmitting the alarm signal via a network to an alarm centre.

10. The optical fire sensor device according to claim 1, wherein the particle detection unit comprises an optical emitter unit for orienting an optical measurement beam through an optical exit region toward the outside of a housing into a focus region, within which a particle detection can be carried out, and an optical detector unit arranged in the housing for detecting the measurement beam scattered by particles and for outputting items of information about the particle concentration.

11. The optical fire sensor device according to claim 10, wherein the optical emitter unit comprises a laser diode, in particular a VCSEL diode and the optical detector unit comprises a photodiode integrated into the laser diode.

12. The optical fire sensor device according to claim 10, wherein the measurement beam and the scattered measurement beam are analyzable by an algorithm by means of the self-mixing interference method.

13. The optical fire sensor device according to claim 1, which is arranged in a portable device.

14. The optical fire sensor device according to claim 13, wherein the portable device is a smart phone.

15. The optical fire sensor device according to claim 1, wherein the fire detection unit is configured to detect at least one of the following fire types:
   an open wood fire,
   a smoldering wood fire,
   a smoldering cotton fire, and
   an open plastic fire.

16. A fire detection method comprising the following steps:
   ascertaining measured values of a particle number in a measurement volume range as a function of a particle size in a predetermined particle size range and/or as a function of a particle speed in a predetermined particle speed range;
   ascertaining respective distributions of the measured values and comparing at least one parameter of the ascertained distributions to at least one predetermined criterion;
   detecting a fire in consideration of the comparison;
   ascertaining a chronological development of the distributions of the measured values;
   detecting the fire and an associated fire type of the fire with additional consideration of the chronological development of the distributions; and
   outputting an alarm signal specifying the fire type in response to the detection of the fire and the associated fire type.

17. The optical fire sensor device according to claim 11, wherein the laser diode is a VCSEL diode.

* * * * *